No. 760,477. PATENTED MAY 24, 1904.
S. H. NYSTROM.
ASH SIFTING SHOVEL.
APPLICATION FILED AUG. 1, 1903.
NO MODEL.

Witnesses:
M. Sihtberg
David Jennings

Inventor,
Svante H. Nystrom,
By Glenn S. Noble
Att'y.

No. 760,477. Patented May 24, 1904.

UNITED STATES PATENT OFFICE.

SVANTE H. NYSTROM, OF CHICAGO, ILLINOIS.

ASH-SIFTING SHOVEL.

SPECIFICATION forming part of Letters Patent No. 760,477, dated May 24, 1904.

Application filed August 1, 1903. Serial No. 167,833. (No model.)

*To all whom it may concern:*

Be it known that I, SVANTE H. NYSTROM, a citizen of the United States, residing at Chicago, in the county of Cook and State of Illinois, have invented certain new and useful Improvements in Ash-Sifting Shovels for Stoves, of which the following is a specification.

This invention relates more particularly to a shovel which may be used under the grate of an ordinary stove for sifting ashes to recover any lumps of unconsumed fuel. Its object is to provide a device of this character which may be conveniently used in the limited space in or above the ash-receptacle and which will be readily formed from a single piece of suitable material.

Figure 1:
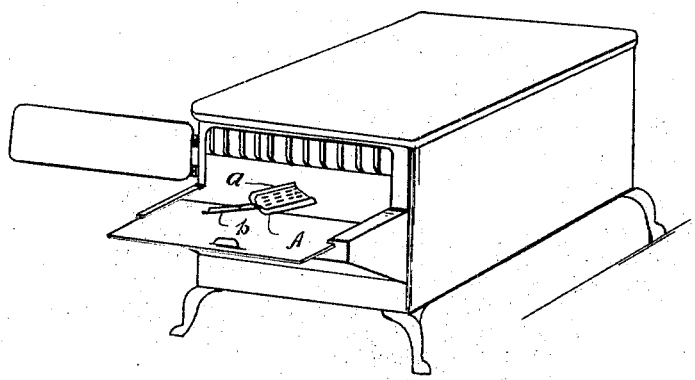
Figure 2:
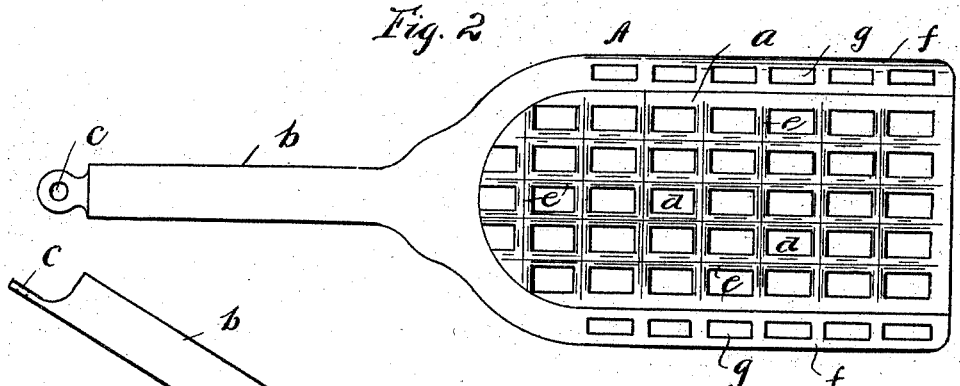
Figure 3:
Figure 4:
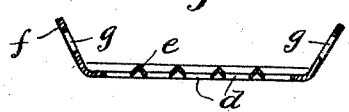

In the accompanying drawings, Figure 1 is a perspective view of a stove, showing the front door open and my improved shovel in position for operation. Fig. 2 is a plan view of the shovel. Fig. 3 is a side view of the same. Fig. 4 is a sectional view through the shovel portion.

As shown in the drawings, A represents the shovel, having a body portion $a$ and a handle $b$. The handle is provided at the outer end with an eye $c$ for convenience in hanging up the shovel. The body portion is cut away at $d\,d$, thereby forming intersecting bars or strips $e\,e$. These strips are preferably formed with an inverted-V-shaped section, which presents a sharp or pointed upper surface, whereby the material is readily discharged through the shovel and the dust or smaller particles will not lodge on the strips.

The upturned sides $f$ of the shovel-body are also provided with apertures $g$ to allow the material to be discharged through the sides when the shovel is given a sidewise motion. In the preferred form of device, which is shown in Figs. 2, 3, 4, the body portion and handle portion of the shovel are formed integrally of a piece of sheet metal, and the openings or reticulations $d$ are punched out by means of a suitable press, and the V-shaped section formed of the cross-ribs is subsequently produced in a second operation.

It is readily apparent that other means for forming the shovel and the reticulated portion will readily suggest themselves as coming within the scope of this invention.

I am aware that heretofore reticulated shovels have been invented and patented which are built in the form of large scoops, but are not adapted to be used for the purpose of this invention. However, I do not claim a reticulated scoop broadly; but

What I claim, and desire to secure by Letters Patent, is—

A stove-shovel comprising a body with upturned sides, said body being formed with rows of approximately rectangular openings, said openings being in longitudinal and transverse alinement with one another, thereby forming horizontal and transverse strips, said strips being struck up to an inverted-V shape in cross-section at a point central thereof, there y forming inclined surfaces leading down into the openings, said upturned sides also being formed with openings in longitudinal alinement with one another and in transverse alinement with the openings in the body, and a handle secured to the said body portion.

SVANTE H. NYSTROM.

Witnesses:
 M. SIKTBERG,
 DAVID JENNINGS.